C. F. & J. B. MOHLER.
Process of Casting Wheels.
No. 200,326.  Patented Feb. 12, 1878.
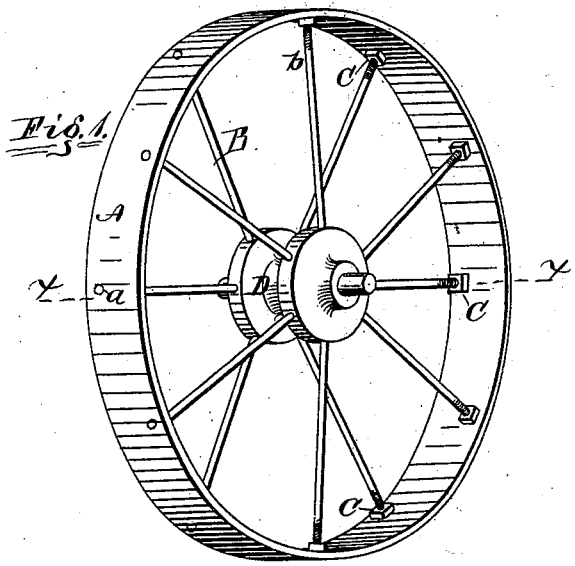
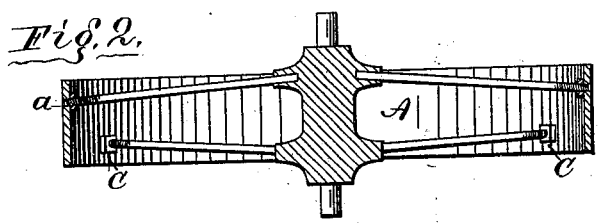
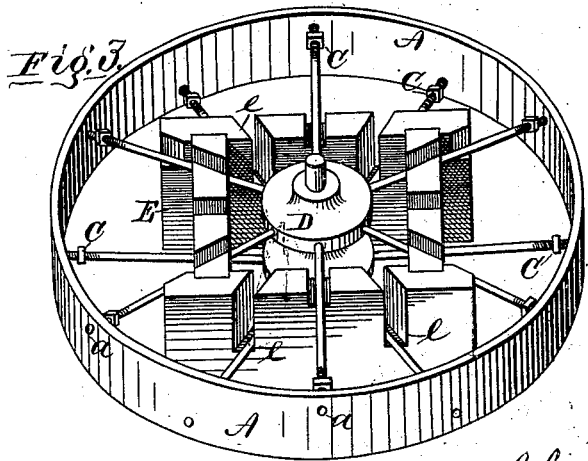
Witnesses:
Wm. C. Barringer.
Harry M. Richards.
Inventors:
Charles F. Mohler
James B. Mohler,
By W. B. Richards,
Atty.

UNITED STATES PATENT OFFICE.

CHARLES F. MOHLER AND JAMES B. MOHLER, OF PEKIN, ASSIGNORS OF ONE-HALF THEIR RIGHT TO ANDREW J. HODGES, OF PEORIA, ILL.

IMPROVEMENT IN PROCESSES OF CASTING WHEELS.

Specification forming part of Letters Patent No. 200,326, dated February 12, 1878; application filed July 28, 1877.

*To all whom it may concern:*

Be it known that we, CHARLES F. MOHLER and JAMES B. MOHLER, of Pekin, in the county of Tazewell and State of Illinois, have invented certain new and useful Improvements in Wheels; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Our invention relates to the construction of wheels; and consists in the hereinafter-described method of constructing wheels having wrought-iron spokes and cast-metal hubs—to wit, placing the spokes loosely in the rim, casting the hub upon the inner end of the spokes, and making the rim concentric by pressure applied about the spokes against the interior of the rim, all as hereinafter more fully set forth.

In the accompanying drawing, Figure 1 is a perspective view of a wheel illustrating our invention. Fig. 2 is a sectional view in the line $x\ x$ in Fig. 1. Fig. 3 is a perspective view of the wheel and the flask used while casting the hub.

In constructing our wheel, the rim A is placed exterior to a molder's flask, E, which contains grooves $e$. The spokes B, having the nuts C, are passed loosely through the holes $a$ in the rim A, and their middle portions, resting in the grooves $e$ in the flask E, will hold their inner ends in position for casting thereon a hub, D, of any desired form.

It is not deemed necessary to illustrate or explain any of the well-known methods of preparing the mold for the hub within the flask E.

After the hub is cast, and either before or after the flask E is removed, one or more of the nuts C are screwed out tightly against the rim A, as shown at Figs. 1 and 2, to secure it firmly in place on the spokes, and to hold the spokes firmly to the rim. The ends of the spokes exterior to the rim may be then riveted or not, as desired.

It will be seen that in the within-described mode of constructing a wheel having a hub cast upon the inner ends of the spokes, the shrinking of the hub in cooling, and the consequent retraction of the spokes, does not affect the rim, and permits the spokes to be retracted freely, while it provides, in the nut C, for an adjustable abutting shoulder for the rim.

Having thus described our invention, we wish it to be distinctly understood that we do not herein claim the wheel as constructed with wrought-iron spokes and cast-metal hub.

What we claim is—

The herein-described method of constructing wheels, consisting in placing the spokes loosely in the rim, casting the hub upon the inner ends of the spokes, and making the rim concentric by pressure applied about the spokes, and maintained against the interior of the rim, substantially as and for the purpose specified.

In testimony that we claim the foregoing as our own we affix our signatures in presence of two witnesses.

CHARLES F. MOHLER.
JAMES B. MOHLER.

Witnesses:
ABIAL B. SAWYER,
A. W. RODECKER.